United States Patent Office 3,295,525
Patented Jan. 3, 1967

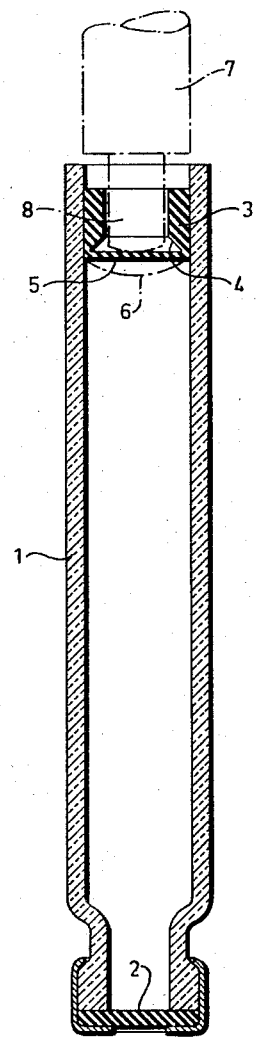

3,295,525
SELF-ASPIRATING CARTRIDGE AMPOULE
Hans Christer Arvid Evers and Sven Paul Littorin, Sodertalje, Sweden, assignors to Aktiebolaget Astra, Apotekarnes Kemiska Fabriker, Sodertalje, Sweden, a company of Sweden
Filed Apr. 7, 1964, Ser. No. 358,034
Claims priority, application Sweden, Apr. 9, 1963, 3,975/63
1 Claim. (Cl. 128—272)

This invention relates to a self-aspirating cartridge ampoule of the known type in which the aspiration is produced by a particular shape of the rubber stopper which is slidable in the ampoule. In this type of ampoules the push rod of the syringe does not need to be provided with particular aspirating means such as claws, hooks or the like.

Self-aspirating cartridge ampoules of this type are known from, for instance, U.S. patent specifications Nos. 2,526,365, 2,554,744, 2,460,039 (see FIG. 10) and 3,045,674.

A cartridge ampoule disclosed in the aforementioned prior art contains a plunger having the shape of a hollow, cylindrical rubber stopper, the upper side of which is covered by a thin membrane. When a pressure is applied to the membrane by the push rod the membrane will be bent down, and simultaneously the entire plunger can be moved. When the pressure is released the rubber membrane goes back to its original plane state, thus producing an aspiration.

When a cartridge ampoule is filled there will always remain a gas bubble in the filled ampoule. This bubble must always be removed before an injection. Therefore, when the ampoule has been inserted into the syringe the operator turns the syringe upside down so that the bubble rises towards the front end of the ampoule. Then he presses out a minor quantity of liquid of the ampoule, the bubble being simultaneously removed. Not until now may the operator carry out the injection. When using a plunger of the type disclosed in the aforementioned prior art it has been found that the bubble often sticks fast in the cylindrical recess of the rubber stopper and is consequently hard to remove before the injection. This is a serious draw-back, in particular as the stopper is untransparent and it is not possible for the operator to find out before the injection whether there is any bubble in the stopper.

The cartridge ampoule of the invention avoids this difficulty, as the bubble rises towards the front portion of the ampoule as soon as the syringe, having an ampoule inserted therein, is turned upside down. It is easy to check that there does not remain any bubble in the ampoule, provided of course that the wall of the ampoule is made of glass or another transparent material. The cartridge ampoule of the invention comprises a substantially rigid, cylindrical ampoule wall, a puncturable closure closing one end of the ampoule, and a plunger closing the other end of the ampoule and being slidable in the ampoule to press out the injection liquid, the plunger being provided with an elastic membrane arranged to produce a self-aspiration in a known way and is characterized in that the front surface of the plunger, facing the interior of the ampoule, includes the elastic membrane and is substantially plane.

The reason why the bubble gets easily loose from the plunger is probably that there is no narrow pocket in the plunger, and that bubbles are probably more inclined to adhering to a rubber surface than to a glass surface. As is well known bubbles have a tendency for gathering in "concave corners." In the known plunger there is a concave corner defined by two rubber walls, whereas the plunger of the present invention has a concave corner defined by a rubber wall and a glass wall.

The invention will now be more fully disclosed with reference to the accompanying drawing which illustrates an embodiment of a cartridge ampoule of the invention.

The cartridge ampoule of the invention consists of a cylindrical container 1 of glass, for instance, having its front end closed by a rubber stopper 2 which can be punctured by the rear end of an injection needle, as known per se. The rear end of the cylindrical container contains a plunger having the shape of a hollow rubber stopper 3. The cylindrical wall of said hollow rubber stopper has such a length as to allow a controlled movement in the ampoule, and the wall has a thinner front portion defined by an interior conical surface 4. The front end of the plunger is closed by a comparatively thin wall 5 which is plane in the normal condition.

The dotted lines indicate the push rod 7 of an injection syringe. The front end 8 of the push rod has such a thickness that it can be inserted without any friction into the hollow plunger so as to engage the wall 5. In the injection operation the wall 5 takes the shape indicated by the dotted line 6. The operator produces an aspiration in the known way by releasing the pressure on the push rod, resulting in the elastic wall 5 going back to its plane state, thus producing a lower pressure in the ampoule.

What we claim is:

A self-aspirating cartridge ampoule, comprising a substantially rigid, cylindrical ampoule wall, a puncturable closure closing one end of the ampoule, and a plunger closing the other end of the ampoule and being slidable in the ampoule to press out the injection liquid, the plunger having in its rear end a recess for receiving the front end of a push rod, said recess having a rear cylindrical portion and a front conically widening portion, the front end of said conically widening portion being limited by a comparatively thin web which with connections to the side walls of the plunger is the outer, substantially plane front end of the plunger, said front end of the plunger being flexible downwardly over its entire length under the downward action of the push rod.

References Cited by the Examiner

UNITED STATES PATENTS

| | | | |
|---|---|---|---|
| 1,783,956 | 12/1930 | Cook | 128—272 |
| 2,526,365 | 10/1950 | Jorgensen | 128—218 |
| 2,577,780 | 12/1951 | Lockhart | 128—272 X |
| 2,895,773 | 7/1959 | McConnaughey | 128—218 |

FOREIGN PATENTS 1,059,151  6/1959  Germany.

RICHARD A. GAUDET, *Primary Examiner.*
DALTON L. TRULUCK, *Examiner.*